United States Patent
Ambikapathi et al.

(10) Patent No.: US 10,991,088 B2
(45) Date of Patent: Apr. 27, 2021

(54) DEFECT INSPECTION SYSTEM AND METHOD USING ARTIFICIAL INTELLIGENCE

(71) Applicant: UTECHZONE CO., LTD., New Taipei (TW)

(72) Inventors: Arulmurugan Ambikapathi, New Taipei (TW); Ming-Tang Hsu, New Taipei (TW); Chia-Liang Lu, New Taipei (TW); Chih-Heng Fang, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 202 days.

(21) Appl. No.: 16/454,034

(22) Filed: Jun. 26, 2019

(65) Prior Publication Data

US 2020/0005449 A1    Jan. 2, 2020

(30) Foreign Application Priority Data

Jun. 29, 2018   (TW) ................................. 107122627

(51) Int. Cl.
*G06T 7/00* (2017.01)
*G06K 9/62* (2006.01)
*G01N 21/88* (2006.01)

(52) U.S. Cl.
CPC .......... *G06T 7/0004* (2013.01); *G06K 9/6267* (2013.01); *G06T 2207/20081* (2013.01); *G06T 2207/30148* (2013.01)

(58) Field of Classification Search
CPC ......... G06T 7/0004; G06T 2207/20081; G06T 2207/30148; G06K 9/6267; G06K 2209/19; G06K 9/627; G06K 9/6256; G01N 21/8851; G01N 2021/8867
See application file for complete search history.

(56) References Cited

U.S. PATENT DOCUMENTS

2020/0005422 A1*   1/2020  Subramanian ........ G06T 1/0014

* cited by examiner

*Primary Examiner* — Asghar H Bilgrami
(74) *Attorney, Agent, or Firm* — JCIPRNET

(57) ABSTRACT

A defect inspection system, connected to an automatic visual inspection device, is provided, including the followings. A re-inspection server (VRS) receives a defect image and a defect location. A training terminal stores trained modules. A classification terminal receives the defect image and the defect location, reads a target trained module corresponding to the defect image, classifies the defect image according to the target trained module to obtain a labeled defect image, and sends the labeled defect image to the VRS. A re-inspection terminal receives the labeled defect image from the VRS, and sends a verified operation corresponding to the labeled defect image to the VRS. A labeling re-inspection terminal receives the verified operation and the labeled defect image, and a labeling result corresponding to the labeled defect image. The VRS sends the labeling result and the labeled defect image to the training terminal to train a corresponding training module.

12 Claims, 2 Drawing Sheets

DEFECT INSPECTION SYSTEM AND METHOD USING ARTIFICIAL INTELLIGENCE

CROSS-REFERENCE TO RELATED APPLICATION

This application claims the priority benefit of Taiwan application serial no. 107122627, filed on Jun. 29, 2018. The entirety of the above-mentioned patent application is hereby incorporated by reference herein and made a part of this specification.

BACKGROUND

Technical Field

The disclosure relates to a defect inspection technology, and more particularly to a defect inspection system and a defect inspection method using artificial intelligence.

Description of Related Art

With the advancement of technology, the precision requirement of electronic components is increasing. To ensure a higher yield of electronic components, the manufacturing process of a circuit board undergoes two stages, i.e. an optical inspection stage and a re-inspection stage. The optical inspection stage serves to obtain an image of an object to be inspected and judge whether a defect exists in the object to be inspected. The re-inspection stage is to further manually check and label the defects judged during the optical inspection stage. Nevertheless, reduction in the huge amount of manpower spent in manufacturing processes becomes a trend in industrial processes. Therefore, how to design a machine and introduce new technologies to improve industrial processes is a dedicated subject for persons skilled in the art.

SUMMARY

The disclosure provides a defect inspection system and a defect inspection method, and by introducing artificial intelligence into industrial processes, the burden of manpower is reduced.

An embodiment of the disclosure provides a defect inspection system connected to an automatic visual inspection device. The defect inspection system includes components as follows. A re-inspection server is connected to the automatic visual inspection device, and receives a defect image and a defect location from the automatic visual inspection device. A training terminal is connected to the re-inspection server and stores at least one trained module. A classification terminal is connected to the re-inspection server and the training terminal, receives the defect image and the defect location from the re-inspection server, and reads a target trained module corresponding to the defect image in at least one trained module. The classification terminal classifies the defect image according to the target trained module to generate a labeled defect image and sends the labeled defect image to the re-inspection server. A re-inspection terminal is connected to the re-inspection server and receives the labeled defect image sent from the re-inspection server. The re-inspection terminal receives a verified operation corresponding to the labeled defect image and sends the verified operation to the re-inspection server. A labeling re-inspection terminal is connected to the re-inspection server, receives the verified operation and the labeled defect image from the re-inspection server, and receives a labeling result corresponding to the labeled defect image. The re-inspection server sends the labeling result and the labeled defect image to the training terminal. The training terminal receives the labeling result and the corresponding labeled defect image from the labeling re-inspection terminal and trains a training module according to the labeling result and the corresponding labeled defect image.

An embodiment of the disclosure provides a defect inspection method. The defect inspection method is applicable to a defect inspection system connected to an automatic visual inspection device. The defect inspection system has a re-inspection server, a training terminal, a labeling re-inspection terminal, a classification terminal, and a re-inspection terminal. The defect inspection method includes the following. The re-inspection server receives a defect image and a defect location from the automatic visual inspection device. The classification terminal receives the defect image and the defect location from the re-inspection server. The classification terminal reads a target trained module corresponding to the defect image, classifies the defect image according to the target trained module to generate a labeled defect image, and sends the labeled defect image to the re-inspection server. The re-inspection terminal receives the labeled defect image sent from the re-inspection server and the labeled defect image is displayed on a display of the re-inspection terminal. The re-inspection terminal receives a verified operation corresponding to the labeled defect image and sends the verified operation to the re-inspection server. The labeling re-inspection terminal receives the verified operation and the labeled defect image from the re-inspection server and receives a labeling result corresponding to the labeled defect image. The re-inspection server receives the labeling result and the labeled defect image and sends the labeling result and the labeled defect image to the training terminal. The training terminal receives the labeling result and the corresponding labeled defect image from the labeling re-inspection terminal and trains a corresponding training module according to the labeling result and the corresponding labeled defect image.

Based on the above, in the defect inspection system and the defect inspection method of the disclosure, the training terminal is adopted, and the training model in the training terminal is read through the classification terminal to automatically classify the defect image of the object to be inspected. As such, the visual inspector only needs to judge the defects that cannot be detected by the classification terminal, so manpower wastage and costs are effectively reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figures 1, 2:
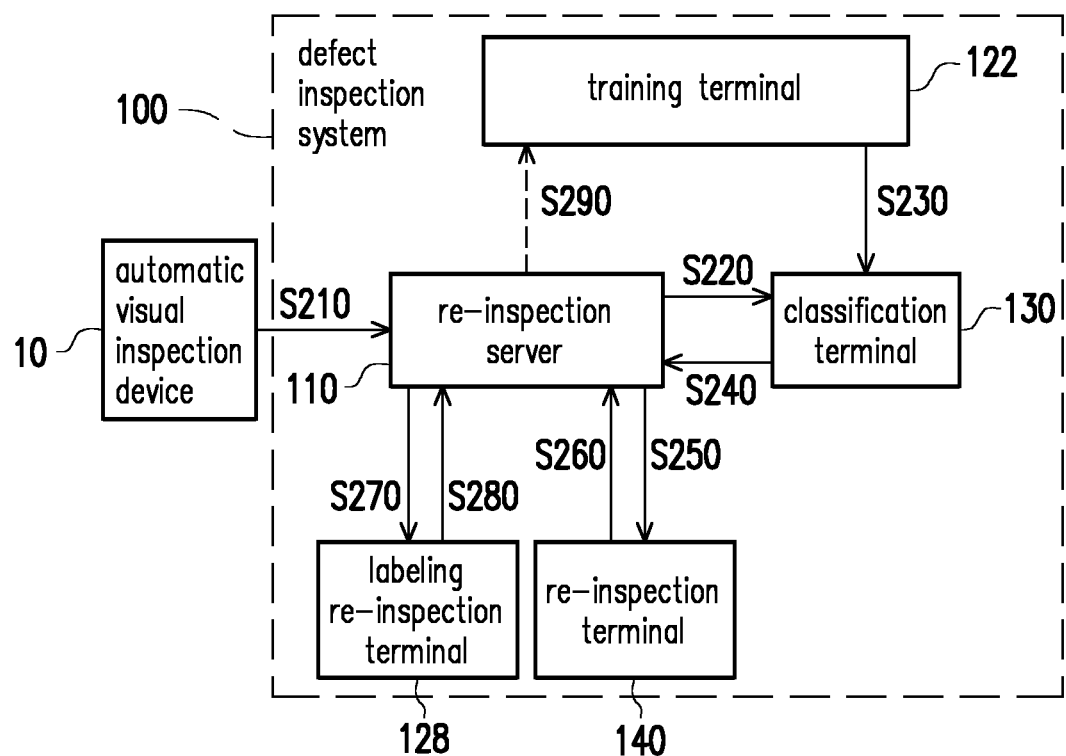
FIG. 1 is a schematic diagram of a defect inspection system according to an embodiment of the disclosure.
FIG. 2 is a schematic diagram of a training system according to an embodiment of the disclosure.

FIG. 1 is a schematic diagram of a defect inspection system according to an embodiment of the disclosure. The system structure and hardware components in a defect inspection system 100 of the disclosure will be illustrated below with reference to FIG. 1.

Firstly, the defect inspection system 100 is connected to an automatic visual inspection device 10. The automatic visual inspection device 10 has an optical element for capturing an image of an object to be inspected. The automatic visual inspection device 10 performs a preliminary defect screening on the object to be inspected through the image of the object to be inspected. If the visual inspection device 10 judges that the object to be inspected has a defect, the defect image and the defect location are sent to the defect inspection system 100.

In an embodiment of the disclosure, the automatic visual inspection device is, for example, an automatic optical inspection (AOI) device or an automatic visual inspection (AVI) device. The object to be inspected is, for example, various types of circuit boards. Common defects are, for example, deviated inner/outer layer, discolored finger, finger with foreign matter, copper exposed finger, blurred text, shed ink, discolored gold surface, gold surface with foreign matter, copper exposed gold surface, electrical logging, fractured finger, shed solder mask, fractured gold surface, stained soft board, etc. The defect image is an image having or is suspected to have a defect feature and is judged to have a defect. The disclosure is not limited to the automatic visual inspection device 10, the object to be inspected, and the defects mentioned above.

The defect inspection system 100 of the disclosure has a re-inspection server (VRS sever) 110, a training terminal 122, a labeling re-inspection terminal (LVRS) 128, a classification terminal 130, and a re-inspection terminal (VRS, Verify Repair Station) 140.

The re-inspection server 110 is connected to the automatic visual inspection device 10 and is applicable for receiving the defect image and the defect location from the automatic visual inspection device 10. In addition, the re-inspection server 110 is also interconnected with other components in the defect inspection system 100 and serves as a relay station for equipment integration and data transfer. Moreover, the re-inspection server 110 also stores the received defect image, enhanced defect image, and/or labeled defect image in the re-inspection server 110. As such, according to different manufacturing procedures, the re-inspection server 110 can send the corresponding defect image, enhanced defect image, and/or labeled defect image to the corresponding processing devices. In an embodiment of the disclosure, the re-inspection server 110 is, for example, a verification repair server. However, the disclosure is not limited to such.

The training system includes a training terminal 122 and a labeling re-inspection terminal 128. The training terminal 122 is connected to the re-inspection server 110 for training, managing, and storing multiple trained modules. The training terminal 122 receives multiple defect images with labeled defect types and inputs the defect images into a deep learning model, so as to obtain the trained model. The training terminal 122 can be implemented using any device with a processor. Also, the training terminal 122 adopts a deep learning model such as, but not limited to, a LeNet model, an AlexNet model, a GoogleNet model, a Visual Geometry Group (VGG) model, or a convolutional neural network based on modifications and expansions of the above models. It is noteworthy that the training terminal 122 establishes different models according to different types of objects to be inspected. For example, every trained model corresponds to a part number. In other words, the trained module corresponds to various defect types that may appear in the part number, and each defect type has a corresponding classification rule.

The labeling re-inspection terminal 128 is connected to the re-inspection server 110, and the function and the application of the labeling re-inspection terminal 128 is similar to the re-inspection terminal 140. The differences are that the labeling re-inspection terminal 128 is operated by a senior visual inspector and the labeled defect images labeled or verified via the labeling re-inspection terminal 128 can be stored in the training system without being verified again. Specifically, although the training level increases with the number of samples inputted and the accuracy of the samples, if the accuracy of the samples is poor, the training level will be low and misjudgments will increase. Therefore, by additionally setting the labeling re-inspection terminal 128 in the factory and assigning the senior visual inspector for operation, the accuracy of the samples can be improved. In addition, when starting establishing the training model, the senior visual inspector can classify multiple sample defect images by using the labeling re-inspection terminal 128, and the classification judged by the senior visual inspector is inputted into the deep learning model, thereby establishing training modules.

The classification terminal 130 is connected to the re-inspection server 110 and the training terminal 122 for obtaining the trained modules and classifying (e.g., Automatic Defect Judgment (ADJ) or Automatic Defect Classification (ADC)) the defect images accordingly. The classification terminal 130 can be implemented using any device with a processor while the disclosure is not limited to such. It is noteworthy that although FIG. 1 only shows one classification terminal 130, the number of classification terminals 130 in other embodiments may also be plural to provide an inspection function for a specific process in any process stage of the entire production line.

The re-inspection terminal 140 is connected to the re-inspection server 110 for displaying the classified labeled defect images on the display, so that the visual inspector can further check whether the defect of the labeled defect image is truly a defect and whether the classification is correct. After the visual inspector checks the labeled defect image, the re-inspection terminal 140 also receives the verified operation inputted by the visual inspector. In the embodiment of the disclosure, the re-inspection terminal 140 can be implemented using any device with a display, a processor, and an input unit (for example, a keyboard, a mouse, a touch screen, etc.). The disclosure is not limited to such. In addition, although FIG. 1 only shows one re-inspection terminal 140, the number of re-inspection terminals 140 in other embodiments may be plural while the disclosure is not limited to such.

In an embodiment of the disclosure, when the re-inspection server 110 is connected to the automatic visual inspection device 10, the training terminal 122, the labeling re-inspection terminal 128, the classification terminal 130, the re-inspection terminal 140, etc., data is exchanged via physical circuits and various types of input ports, such as a Universal Serial Bus (USB), a serial port, a FireWire (with IEEE 1394 standard), VERSAmodule Eurocard (VME) bus, etc. Alternatively, the re-inspection server 110 can also be implemented as including various types of communication chips, such as a Bluetooth chip, a WiFi chip, etc., so as to exchange data. The disclosure is not limited to such.

The steps of the interaction between various components in the defect inspection system 100 to execute the defect inspection method will be described below with reference to FIG. 1.

In Step S210, the re-inspection server 110 receives the defect image and the defect location from the automatic visual inspection device 10. The re-inspection server 110 sends an unlabeled defect image to the classification terminal 130.

In Step S220, the classification terminal 130 receives the defect image and the defect location from the re-inspection server 110.

In Step S230, the classification terminal 130 reads the target trained module corresponding to the defect image in the trained modules.

Specifically, as mentioned above, every trained module corresponds to a part number of the object to be inspected. In other words, the part number corresponding to the target trained module read by the classification terminal 130 is the same as the part number of the object to be inspected. In an embodiment of the disclosure, the part number of the object to be inspected is recorded on the defect image, and the classification terminal 130 can identify and obtain the part number, thereby reading the target trained module. In other embodiments of the disclosure, the part number of the object to be inspected may also be inputted to the automatic visual inspection device 10 and sent to the classification terminal 130 via the re-inspection server 110. The disclosure is not limited to such.

After obtaining the defect image and the target trained module, the classification terminal 130 classifies and labels the defect image according to the target trained module to generate the labeled defect image. In other words, the labeled defect image substantially has the defect image and the defect label corresponding to the defect image, so as to record the defect type which the defect image belongs to.

In Step S240, the classification terminal 130 sends the labeled defect image to the re-inspection server 110.

In Step S250, the re-inspection terminal 140 receives the labeled defect image sent from the re-inspection server 110 and displays the labeled defect image on the display of the re-inspection terminal 140.

In Step S260, the re-inspection terminal 140 receives the verified operation of the corresponding labeled defect image and sends the verified operation to the re-inspection server 110. In an embodiment of the disclosure, the re-inspection terminal 140 receives the verified operation inputted by the visual inspector via the input unit. Specifically, after displaying the labeled defect image, the re-inspection terminal 140 provides options of correct and incorrect for the visual inspector to select. If the visual inspector judges that the actual defect and the defect label of the labeled defect image are the same, the classification of the classification terminal 130 is correct. As such, the visual inspector can select on the option of correct. If the visual inspector judges that the actual defect and the defect label of the labeled defect image are different, the classification of the classification terminal 130 is incorrect. The re-inspection terminal 140 records and sends the verified operation of the visual inspector to the re-inspection server 110.

It is worth mentioning that, by classifying and labeling via the classification terminal 130 first, the visual inspector only needs to judge the labeled defect image labeled with a null value (that is, a defect not detectable by the classification terminal 130). Therefore, the time of the operation of the visual inspector is greatly reduced. For a labeled defect image whose label is not a null value, the visual inspector only needs to confirm without the need for additional classification. Furthermore, if the training level of the training model is considerably high with accuracy approaching 100%, the factory may also adjust the re-inspection policy of the visual inspectors depending on the situation, thereby reducing manpower costs.

In Step S270, the labeling re-inspection terminal 128 receives the verified operation from the re-inspection server 110. At this point, the senior visual inspector can reconfirm whether the verified operation by the visual inspector is correct. If the verified operation by the visual inspector is not correct, the senior visual inspector can further select the incorrect image. The labeling re-inspection terminal 128 may further provide various defect types for the senior visual inspector to select the correct defect type.

In Step S280, the labeling re-inspection terminal 128 records the defect type selected by the senior visual inspector and sends the labeling result of the senior visual inspector to the re-inspection server 110. In other words, the labeling result of the senior visual inspector is directly applied to the training of the model without the need for further verification.

In Step S290, the re-inspection server 110 sends the labeling result and the labeled defect image to the training terminal 122. The training terminal 122 trains according to the labeling result and the labeled defect image to update the target trained module.

Specifically, the classification terminal 130 classifies according to the trained modules trained by the training terminal 122. Therefore, the accuracy of classification by the classification terminal 130 is correlated positively with the training level of the trained modules. For the trained modules, the training level thereof increases with the number of samples inputted and the accuracy of the samples. Based on this, in the embodiment of the disclosure, the accuracy of the samples can be increased via the re-confirmation by the senior visual operator at the labeling re-inspection terminal 128. By further inputting the labeled defect image to the training terminal 122 by the re-inspection server 110, the number of samples inputted can be increased. As such, the disclosure can further enhance the training level of the target trained module.

FIG. 2 is a schematic diagram of a training system according to an embodiment of the disclosure. The operation method of the training terminal 122 and the labeling re-inspection terminal 128 in the training system will be described below with reference to FIG. 2. The training terminal 122 serves to input the training sample and the labeled defect image into the deep learning model to train a target trained module 124. In addition, the training terminal 122 stores trained modules 126. Specifically, when the training terminal 122 inputs the training sample and the labeled defect image into the deep learning model, the corresponding module is trained according to the type (for example, the part number) which the training sample and the labeled defect image belong to. In other words, the training sample, the labeled defect image, and the target trained module 124 correspond to the same type. The trained modules are output from the deep learning model, and the training terminal 122 stores the trained modules 126 in a storage unit (for example, a hard disk) of the training terminal 122. In an embodiment of the disclosure, the training terminal 122 is implemented using hardware with a processor sufficient to run the deep learning model. The disclosure is not limited to such.

In addition to re-verifying the verified operation from the re-inspection terminal 140, the labeling re-inspection terminal 128 can also cooperate independently with the training terminal 122 without the verified operation of the re-inspection terminal 140 to classify and label the defect image from the automatic visual inspection device directly, thereby generating or updating the target trained module 124. It is worth mentioning that in other embodiments of the disclosure, under cost consideration and factory design consideration, the labeling re-inspection terminal 128 may also be incorporated into and operated in the re-inspection terminal 140. Alternatively, in another embodiment of the disclosure, the training terminal 122 and the labeling re-inspection terminal 128 may also exchange data directly without exchanging through the re-inspection server 110. The disclosure is not limited to such. In Step S310, the re-inspection server 110 receives the defect image and the defect location from the automatic visual inspection device 10.

In Step S320, the labeling re-inspection terminal 128 receives the defect image or the labeled defect image sent from the re-inspection server 100. The labeling re-inspection terminal 128 displays the defect image or the labeled defect image and receives the classification result corresponding to the defect image or the verified operation corresponding to the labeled defect image.

Specifically, in an embodiment of the disclosure, when the defect inspection system 100 does not have the trained module corresponding to the object to be inspected, or is in a modeling/updating mode, the re-inspection server 110 may input the defect image into the labeling re-inspection terminal 128 directly upon receiving the defect image and the defect location from the automatic visual inspection device 10. The labeling re-inspection terminal 128 may generate the classification result according to the classification inputted after manual interpretation, and applies the classification result directly to the trained sample for modeling or updating.

If the defect inspection system 100 already has the trained module corresponding to the object to be inspected, the defect inspection system 100 can also generate a labeled defect image of the object to be inspected through the trained modules and submit the labeled defect image to the re-inspection terminal 140 and the labeling re-inspection terminal 128 to verify (as shown in Steps S220 to S290 of FIG. 1). The labeled defect image is further feedbacked to the training terminal 122 according to the labeling result.

After the labeling re-inspection terminal 128 receives and stores the classification result corresponding to the defect image or the verified operation corresponding to the labeled defect image, the unlabeled defect image is labeled and the verified operation is stored. Then, the classification result or the verified operation and the labeled defect image are sent to the re-inspection server 110.

In Step S330, the re-inspection server 110 receives the verified operation and the labeled defect image from the labeling re-inspection terminal 128.

In Step S340, the training terminal 122 receives the verified operation and the labeled defect image from the labeling re-inspection terminal 128 via the re-inspection server 110, and trains the training module (in this case, the target trained module 124) corresponding to the labeled defect image according to the verified operation and the labeled defect image. Modules having completed training (i.e., the trained modules 126) are stored in the training terminal 122. As such, the training terminal 122 can be modeled via the cooperation of the labeling re-inspection terminal 128 and update the training modules continuously.

Figure 3:
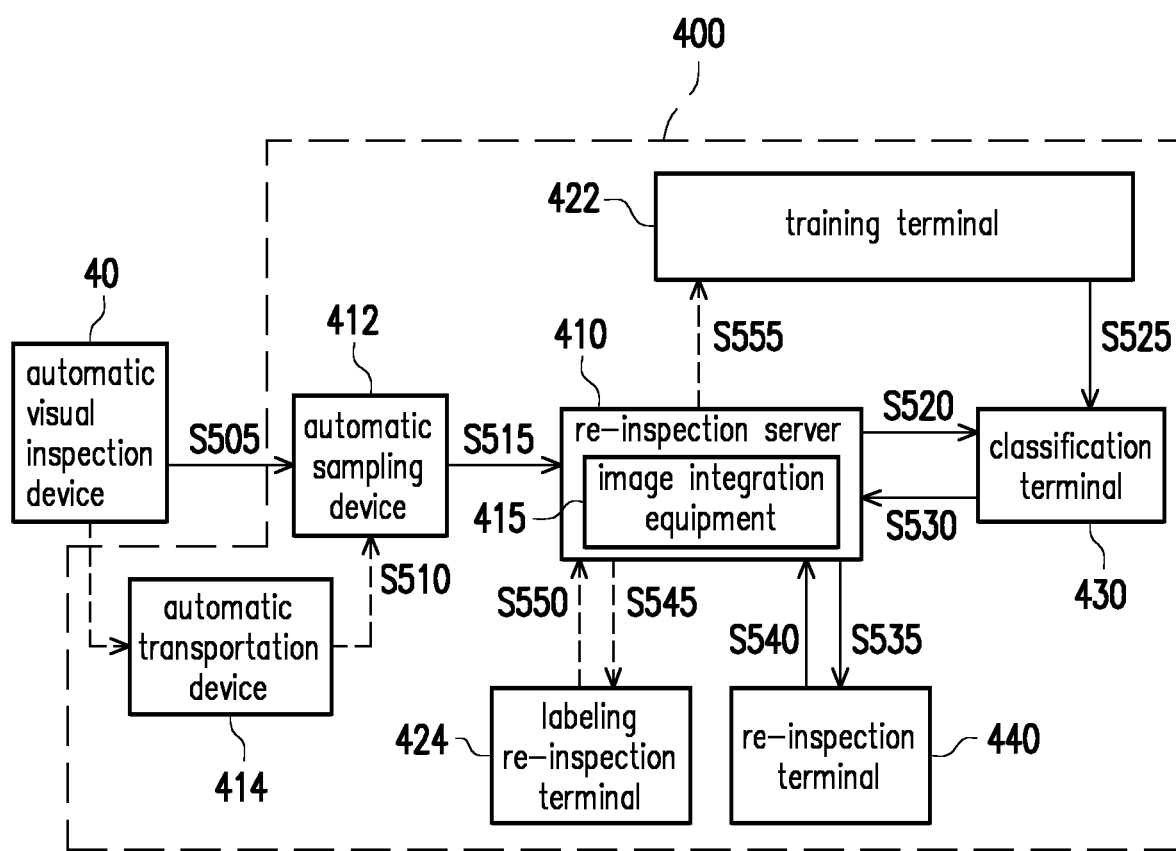
FIG. 3 is a schematic diagram of a defect inspection system according to another embodiment of the disclosure.

FIG. 3 is a schematic diagram of a defect inspection system according to another embodiment of the disclosure. The embodiment of FIG. 3 is mainly based on and derived from the embodiment of FIG. 1. Referring to FIG. 3, a defect inspection system 400 is connected to an automatic visual inspection device 40 and has a re-inspection server 410, a classification terminal 430, a re-inspection terminal 440, and a training system including a training terminal 422 and a labeling re-inspection terminal 424. Here, the automatic visual inspection device 40, the re-inspection server 410, the training terminal 422, the labeling re-inspection terminal 424, the classification terminal 430, and the re-inspection terminal 440 are similar to the automatic visual inspection device 10, the re-inspection server 110, the training terminal 122, the labeling re-inspection terminal 128, the classification terminal 130, and the re-inspection terminal 140 of FIG. 1. As such, the hardware structures and the functions of the re-inspection server 410, the training terminal 422, the labeling re-inspection terminal 424, the classification terminal 430, and the re-inspection terminal 440 will not be repeated in the following.

However, compared with FIG. 1 and FIG. 2, the defect inspection system 400 of the disclosure further includes an automatic sampling device 412 and an automatic transportation device 414.

The automatic sampling device 412 is located between the automatic visual inspection device 40 and the re-inspection server 410 and is connected to the automatic visual inspection device 40 and the re-inspection server 410. The automatic sampling device 412 receives defect coordinates from the automatic visual inspection device 10 and resamples the object to be inspected according to the defect coordinates. Specifically, in the automatic visual inspection device 40, there may be a case where the defect coordinates are detected but the defect is not obvious. In such case, the image feature of the defect can be enhanced via the automatic sampling device 412, and the enhanced defect feature can thus be captured.

In an embodiment of the disclosure, the automatic sampling device 412 has an optical element (for example, a camera) and a light source device. The parameters of the optical element are adjustable. The parameters are, for example, intrinsic parameters (such as the focal length, image distance, position of lens projection center formed on an image, pixel aspect ratio, lens distortion parameters, etc.) or extrinsic parameters (such as the position and shooting direction of a camera in three-dimensional coordinates, including rotation matrix and displacement matrix). The automatic sampling device 410 adjusts the parameters of the optical element according to the defect feature of the defect image provided by the automatic visual inspection device 40, thereby capturing the image of the object to be inspected at the defect location.

The parameters of the light source device are also adjustable. The automatic sampling device 410 adjusts the parameters of the light source device, such as a light source emitting lights of different spectrums (for example a white light, a red light, a blue light, a green light, a yellow light, a UV light, or a laser light), according to the defect feature of the defect image provided by the automatic visual inspection device 40, and further adjusts the intensity and the angle of illumination of the light source to assist the optical element in capturing the image, thereby obtaining the enhanced defect image. The image feature of the enhanced defect image is better than the defect image, and helps facilitate subsequent classification and learning. It is noteworthy that, in the embodiment, during subsequent classification, visual inspection, and training with respect to the defect image, the defect image is replaced by the enhanced defect image.

The automatic transportation device 414 is communicationally connected to the automatic visual inspection device 40 and the automatic sampling device 412. The automatic transportation device 414 is installed with a routing program. When receiving a completion signal of the automatic visual inspection device 40, the automatic transportation device 414 approaches and transports the object to be inspected on the sample stage of the automatic visual inspection device 40 to the sample stage of the automatic sampling device 412. As such, the automatic transportation device 414 can replace manpower in the process of transporting the object to be inspected, thereby reducing human errors while reducing the burden of manpower.

It is worth mentioning that the training system requires a considerable amount of data and the image information will continue to grow with respect to the re-inspection stage of the industrial process. If all the image data is stored in the re-inspection server 410, the storage space of the re-inspection server 410 may be insufficient or the transfer and processing speed of the re-inspection server 410 may become slower. To cope with the large amount of image data, in the embodiment of the disclosure, an image integration device 412 (image station) may be further provided in the re-inspection server 410 of the defect inspection system 400. The image integration device 412 has a large storage space, so all the defect images, the enhanced defect images, and/or the labeled defect images can be stored in the image integration device 412. As such, the re-inspection server 410 can store all the received defect images, enhanced defect images, and/or labeled defect images in the image integration device 412. In addition, when the re-inspection server 410 sends the defect images, the enhanced defect images, and/or the labeled defect images to the classification terminal 430, the re-inspection terminal 440, the training terminal 422, and the labeling re-inspection terminal 424, the re-inspection server 410 may send only the storage locations of the files, and the aforementioned devices may access the image integration device accordingly and download the files or process the files on-line. As such, the image transfer is facilitated. In addition, the image integration device may also have multiple storage devices (for example hard drives, solid-state drives, etc.) to back up the images and have flexibility in space expansion.

The interaction of the various components in another embodiment of the disclosure will be described below with reference to FIG. 3.

In Step S505, the automatic sampling device 412 receives the defect image and the defect coordinates from the automatic visual inspection device 40.

In addition, in Step S510, the automatic transportation device 414 plans the path from the automatic visual inspection device 40 to the automatic sampling device 412 upon receiving the completion signal of the automatic visual inspection device 40 so as to approach and transport the object to be inspected on the sample stage of the automatic visual inspection device 40 to the sample stage of the automatic sampling device 412.

Through Steps S505 and S510, the automatic sampling device 412 adjusts the parameters of the light source device and the optical element according to the defect feature of the defect image of the object to be inspected, and resamples the object to be inspected according to the defect coordinate to obtain the enhanced defect image. The sequence of Steps S505 and S510 is not limited to the aforementioned.

In Step S515, the automatic sampling device 412 also sends the enhanced feature image to the re-inspection server 410.

Steps S520 to S540 correspond to the steps S220 to S260 of FIG. 1. The difference is that, in Steps S520 to S540, the defect image is replaced with the enhanced feature image. In other words, the processed carried out by the re-inspection server 410, the classification terminal 430, and the re-inspection terminal 440 are all based on the enhanced feature image. Since the difference between the enhanced feature image and the defect image lies in the sampling results, the difference does not affect the structure of the defect inspection system 100. Therefore, the details of Steps S520 to S540 will not be described here.

Steps S545 to S555 are the same as Steps S320 to S340 of FIG. 2. In particular, like Steps S320 to S340, the labeled defect image of the object to be inspected is generated via the trained modules, and after manual verification, the labeled defect image is further feedbacked to the training terminal 422 according to the verification operation. Therefore, the details of Steps S520 to S540 will not be described here.

It is worth mentioning that, in the defect inspection system according to an embodiment of the disclosure, the re-inspection server, the training terminal, the labeling re-inspection terminal, the classification terminal, the re-inspection terminal, the automatic transportation device, and the automatic sampling device are all independent components. Therefore, factory wise, the defect inspection system of the disclosure can be achieved by keeping the existing re-inspection terminal, updating the operation system of the existing re-inspection server, and additionally purchasing remaining components. Also, when the demand for a particular component is tight, additional components of the same kind may be purchased independently to allow the defect inspection system to handle a higher load. Based on such, the defect inspection system is expandable and may be implemented in the existing defect inspection system to reduce the cost of factory equipment replacements.

In conclusion, in the defect inspection system and the defect inspection method of the disclosure, the training terminal is adopted, and the training model in the training terminal is read through the classification terminal, so as to automatically classify the defect image of the object to be inspected. As such, the visual inspector only needs to judge the defects that cannot be detected by the classification terminal, so manpower wastage and costs are effectively reduced. Moreover, the defect inspection system of the disclosure is expandable and may be implemented in the existing defect inspection system to reduce the cost of factory equipment replacements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A defect inspection system using artificial intelligence and connected to an automatic visual inspection device, the defect inspection system comprising:

a re-inspection server, connected to the automatic visual inspection device and receiving a defect image and a defect location from the automatic visual inspection device;

a training terminal, connected to the re-inspection server and storing at least one trained module;

a classification terminal, connected to the re-inspection server and the training terminal, receiving the defect image and the defect location from the re-inspection server, reading a target trained module corresponding to the defect image in the at least one trained module, classifying the defect image according to the target trained module to generate a labeled defect image, and sending the labeled defect image to the re-inspection server;

a re-inspection terminal, connected to the re-inspection server, receiving the labeled defect image sent from the re-inspection server, receiving a verified operation corresponding to the labeled defect image, and sending the verified operation to the re-inspection server; and a labeling re-inspection terminal, connected to the re-inspection server, receiving the verified operation and the labeled defect image from the re-inspection server, and receiving a labeling result corresponding to the labeled defect image;

wherein the re-inspection server sends the labeling result and the labeled defect image to the training terminal, and the training terminal receives the labeling result and the corresponding labeled defect image from the labeling re-inspection terminal and trains a corresponding training module according to the labeling result and the corresponding labeled defect image.

2. The defect inspection system according to claim 1, wherein the labeling re-inspection terminal further receives the defect image and a classification result corresponding to the defect image which are sent from the re-inspection server, and the training terminal further receives the classification result and the corresponding defect image from the labeling re-inspection terminal and trains a corresponding training module according to the classification result and the corresponding defect image.

3. The defect inspection system according to claim 2, wherein the training terminal further inputs the labeled defect image into a deep learning model to train the training module.

4. The defect inspection system according to claim 1, further comprising:

an automatic sampling device, connected to the automatic visual inspection device and the re-inspection server, receiving defect coordinates from the automatic visual inspection device, wherein the defect coordinates correspond to an object to be inspected, wherein the automatic sampling device further resamples the object to be inspected according to the defect coordinates to obtain an enhanced feature image, and the automatic sampling device further sends the enhanced feature image to the re-inspection server.

5. The defect inspection system according to claim 4, further comprising:

an automatic transportation device, communicationally connected to the automatic visual inspection device and the automatic sampling device, approaching and transporting the object to be inspected from a sample stage of the automatic visual inspection device to a sample stage of the automatic sampling device upon receiving a completion signal of the transportation device.

6. The defect inspection system according to claim 1, wherein the re-inspection server further comprises:

an image integration device, storing the defect image and the labeled defect image.

7. A defect inspection method using artificial intelligence for a defect inspection system connected to an automatic visual inspection device, wherein the defect inspection system comprises a re-inspection server, a training terminal, a labeling re-inspection terminal, a classification terminal, and a re-inspection terminal, the defect inspection method comprising:

receiving a defect image and a defect location from the automatic visual inspection device by the re-inspection server;

receiving the defect image and the defect location from the re-inspection server by the classification terminal;

reading a target trained module corresponding to the defect image, classifying the defect image according to the target trained module to generate a labeled defect image, and sending the labeled defect image to the re-inspection server by the classification terminal;

receiving, by the re-inspection terminal, the labeled defect image sent from the re-inspection server and displaying the labeled defect image on a display of the re-inspection terminal;

receiving a verified operation corresponding to the labeled defect image and sending the verified operation to the re-inspection server by the re-inspection terminal;

receiving the verified operation and the labeled defect image from the re-inspection server and receiving a labeling result corresponding to the labeled defect image by the labeling re-inspection terminal;

receiving the labeling result and the labeled defect image and sending the labeling result and the labeled defect image to the training terminal by the re-inspection server; and receiving the labeling result and the corresponding labeled defect image from the labeling re-inspection terminal and training a corresponding training module according to the labeling result and the corresponding labeled defect image by the training terminal.

8. The defect inspection method according to claim 7, wherein the defect inspection method further comprises:

receiving, by the labeling re-inspection terminal, the defect image and a classification corresponding to the defect image sent from the re-inspection server, and receiving the classification result and the corresponding defect image from the labeling re-inspection terminal and training a corresponding training module according to the classification result and the corresponding defect image by the training terminal.

9. The defect inspection method according to claim 8, wherein receiving the classification result and the corresponding defect image from the labeling re-inspection terminal and training the corresponding training module according to the classification result and the corresponding defect image by the training terminal further comprises:

inputting the labeled defect image into an deep learning model by the training terminal to train the training module.

10. The defect inspection method according to claim 7, wherein the defect inspection system further comprises an automatic sampling device, and the defect inspection method further comprises:

receiving defect coordinates from the automatic visual inspection device by the automatic sampling device (ACM), wherein the defect coordinates correspond to an object to be inspected;

resampling the object to be inspected according to the defect coordinates by the automatic sampling device to obtain an enhanced feature image; and sending the enhanced feature image to the re-inspection server by the automatic sampling device.

11. The defect inspection method according to claim 7, wherein the defect inspection system further comprises an automatic transportation device, and the defect inspection method further comprises:

receiving a completion signal of the automatic visual inspection device by the automatic transportation device; and approaching and transporting the object to be inspected from a sample stage of the automatic visual inspection device to a sample stage of the automatic sampling device by the automatic transportation device.

12. The defect inspection method according to claim 7, wherein the defect inspection system further comprises an image integration device, and the defect inspection method further comprises:

storing the defect image and the labeled defect image by the image integration device.

* * * * *